F. J. DE SOTO.
AUTOMATIC SAFETY BRAKE.
APPLICATION FILED JUNE 25, 1917.
1,251,871.
Patented Jan. 1, 1918.
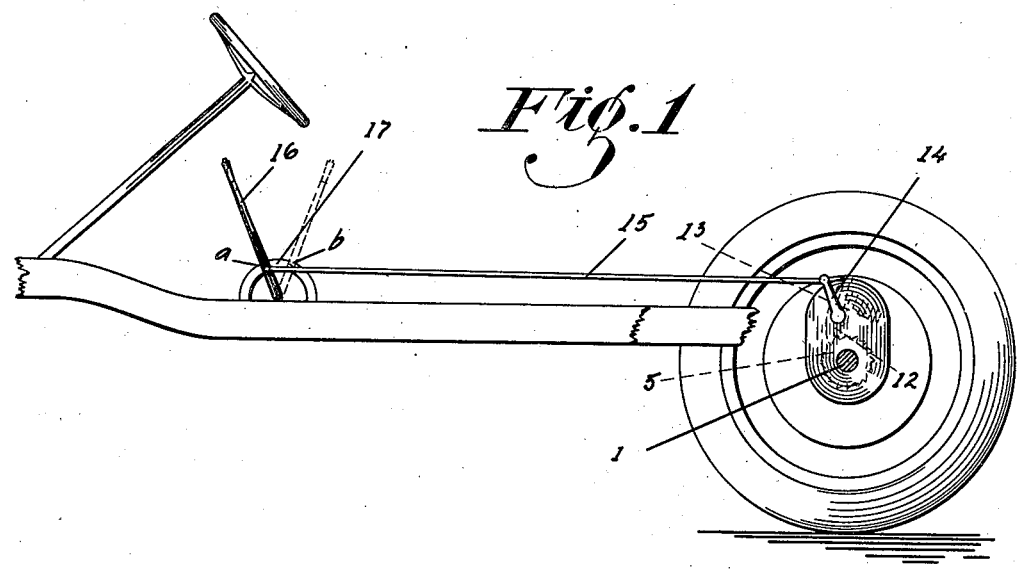
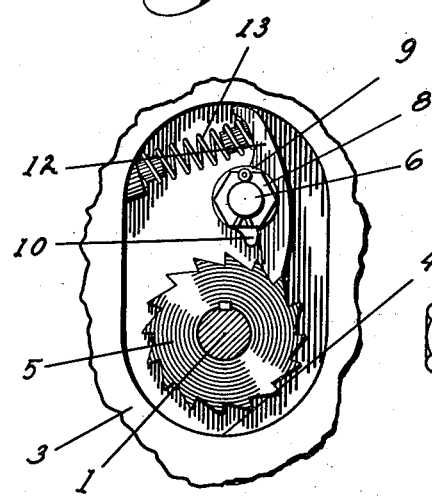
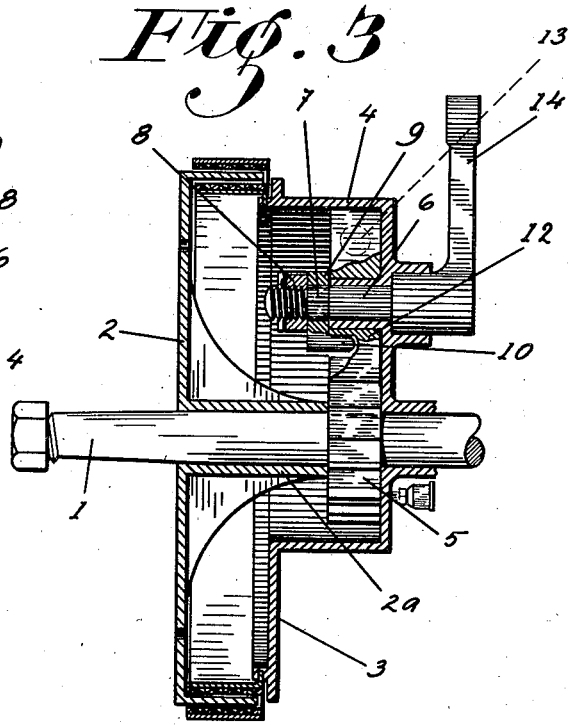
WITNESS:
Bernard Privat
INVENTOR.
Fred J. Desoto
BY
B. Webster
ATTORNEY.

UNITED STATES PATENT OFFICE.

FRED J. DE SOTO, OF VALLEY SPRINGS, CALIFORNIA, ASSIGNOR OF ONE-THIRD TO CONRAD FREDERICK KAISER AND ONE-THIRD TO WILLIAM H. MORRIS, BOTH OF VALLEY SPRINGS, CALIFORNIA.

AUTOMATIC SAFETY-BRAKE.

1,251,871.  Specification of Letters Patent.  Patented Jan. 1, 1918.

Application filed June 25, 1917. Serial No. 176,681.

*To all whom it may concern:*

Be it known that I, FRED J. DE SOTO, a citizen of the United States, residing at Valley Springs, in the county of Calaveras, State of California, have invented certain new and useful Improvements in Automatic Safety-Brakes; and I do declare the following to be a full, clear, and exact description of the same, reference being had to the accompanying drawings, and to the characters of reference marked thereon, which form a part of this application.

This invention relates to improvements in brakes and particularly to those used on motor vehicles. The object of the invention is to provide an automatic safety brake for use on motor vehicles whereby they may be held against backing down a grade when the motive power of the vehicle comes to a stop or is disconnected from the driving gear thereof.

It is a matter of great difficulty when the motor car is stopped on a grade to get the same started again due to the fact that it is necessary to release the brakes and throw the engine into gear with the vehicle all in one and the same operation. Even if this dual operation is successfully manipulated it creates a terrific strain on the mechanism of the vehicle due to the weight of the vehicle dragging against all the parts just as they are placed in connection with each other. Furthermore the motive power of a vehicle often fails on a grade and if the service brakes fail to operate properly there is immediate danger of the vehicle backing down or off the grade to the injury of the vehicle and the occupants thereof.

In my improved invention I provide a brake means which may be turned into operation when the vehicle is ascending a grade whereby if the vehicle comes to a standstill on a grade for any purpose such brake automatically prevents its backing down the grade and will hold it stationary thereon. At the same time the forward movement of the vehicle is unrestricted.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a fragmentary side view of the chassis of a motor vehicle showing the location of my improved brake with respect to the rear axle and wheel.

Fig. 2 is a front elevation of my complete mechanism.

Fig. 3 is a sectional view through the brake drum of the rear vehicle wheel showing the manner in which my improved brake means is applied to the rear axle.

Referring now more particularly to the drawings the characters of reference on the drawings the numeral 1 designates the rear axle to which are connected the rear wheels in the usual manner. The numeral 2 designates the outer brake drum which is secured to the wheel. 2$^a$, is the bearing portion of this member disposed between my improved safety device and the hub, while the numeral 3 is the inner casing which is flanged and to which is connected the internal brake mechanism.

In providing my improved invention I form as a part of the casing 3, a housing 4 through which the axle 1 projects. Within the housing 4 I key or otherwise fasten to the axle 1 a ratchet wheel 5. Journaled in the axle 1 a ratchet wheel 5. Journaled in the housing 4 above the ratchet wheel 5 is a small pin 6 having a squared portion 7. A nut 8 holds a collar 9 in position on the square portion 7. The said collar 9 is likewise made square so as to fit on the portion 7 and be held against rotary motion on the pin 6, so that the said member 9 will move with such pin 6. On the member 9 is a small projecting finger member 10 which extends underneath a dog 12 turnably mounted around the pin 6. A spring 13 normally acts against the dog 12 and tends to hold the same in engagement with the ratchet wheel 5. On the pin 6 is an arm 14 connected by a rod or cable 15 with a lever 16 movable over the quadrant 17 disposed adjacent the driving seat of the vehicle. This lever 16 has a movement between two given points "*a*" and "*b*" on the quadrant 17. When the lever 16 is at the point "*a*" it pulls against the arm 14 to turn the pin 6 and move the finger member 10 out of the path of the dog 12. The spring 13 under these conditions holds the dog 12 into engagement with the ratchet wheel 5. The position of the ratchets of such wheel are such that the forward movement of the shaft 1 is unrestricted. Should any backward movement thereof tend to take place the dog 12 engaging the ratchet wheel 5 prevents such movement. Thus when the vehicle is ascending a grade the operator moves the lever 16 to the point "a" and the dog 12 thereupon engages the ratchet wheel 5. The forward movement of the vehicle is continued and if the grade is successfully manipulated without stops, well and good. If however, the vehicle comes to a stop and the service brakes fail to hold or must be released in order to start the vehicle again the dog 12 prevents any undesired backward movement of such vehicle. Then when the necessity of the brake has passed the lever 16 is moved to the point "b" whereupon the finger member 10 engages the dog 12 and turns it out of the path of the ratchet wheel 5 and holds it there until the use of the brake is again desired.

My improved mechanism may be placed on one or more wheels as is found desirable.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claim.

Having thus described my invention what I claim as new and useful and desire to secure by Letters Patent is:

A safety brake for motor vehicles comprising a ratchet wheel fixed to the rear axle of the vehicle, a dog mounted for engagement with the ratchet wheel to prevent backward movement thereof, and means for normally holding the dog out of engagement with said ratchet wheel, such means including a turnable pin projecting through the dog, a square shoulder on the pin adjacent the dog, a collar mounted on the square shoulder whereby it will move with the pin, a finger member on the collar extending underneath the dog, and means for turning the pin to cause the finger member to engage the under side of the dog and lift it out of engagement with the ratchet wheel.

In testimony whereof I affix my signature.

FRED J. DE SOTO.